United States Patent
Hooper

[15] 3,690,790
[45] Sept. 12, 1972

[54] TIDE-POWERED UNIT AND FLOATING PLATFORM UTILIZING SAME

[72] Inventor: George H. Hooper, 2092 East Main Street, Bridgeport, Conn. 06610

[22] Filed: Dec. 7, 1970

[21] Appl. No.: 95,543

[52] U.S. Cl.....................417/331, 417/568, 92/98 D
[51] Int. Cl.....F04b 17/00, F04b 35/00, F04b 21/02, F04b 39/10, F01b 19/00
[58] Field of Search........417/331, 333, 568; 92/98 D

[56] References Cited

UNITED STATES PATENTS

| | | | |
|---|---|---|---|
| 1,523,031 | 1/1925 | Mitchell, Jr. | 417/333 |
| 1,665,140 | 4/1928 | Master | 417/331 |
| 2,871,790 | 2/1959 | Weills | 417/333 |
| 3,126,830 | 3/1964 | Dilliner | 417/331 |
| 3,485,419 | 12/1969 | Taylor | 417/568 X |
| 3,373,694 | 3/1968 | Taplin | 92/98 D X |
| 961,401 | 6/1910 | Bonney | 417/331 |
| 879,992 | 2/1908 | Wilson | 417/331 |

*Primary Examiner*—Robert M. Walker
*Attorney*—H. Gibner Lehmann and K. Gibner Lehmann

[57] ABSTRACT

A tide-powered unit for generating electrical power, comprising a relatively large-diameter cylinder and piston therein, disposed with their axes vertical, the piston being capable of a raising and lowering movement through the open top of the cylinder. The lower portion of the cylinder is attached to a base or anchorage located on the bottom of a large body of water the level of which is influenced by tides. The piston is operatively connected to a float whereby both will rise and fall as the tide comes in and goes out. The cylinder has inlet and outlet passages which are valved to permit ingress of water into the cylinder as the piston rises, and to provide for egress of water from the cylinder as the piston descends. The outlet, through which the water leaves the cylinder, goes to a reservoir located above the high tide mark whereby the rise and fall of the tide causes a pumping of tide water into the reservoir. When the reservoir fills, the water stored therein can be used to turn hydroelectric generators for generating electric power. A multiplicity of such power units is shown as being disposed side by side beneath a large platform whereby the latter is supported by the floats of the units and can carry buildings, equipment and other facilities. Where the supported platform is sufficiently large, it functions also as an air strip for the landing and take-off of aircraft. The platform imperceptably rises and falls with the tides whereby it is always at a given fixed level above the surface of the body of water. The large number of power units supporting the platform totalize to provide a large amount of ultimate hydroelectric power originating with the rise and fall of the tide. Automatically controlled water ballasts associated with the power units compensate for any unequal loading on the platform supported thereby.

9 Claims, 3 Drawing Figures

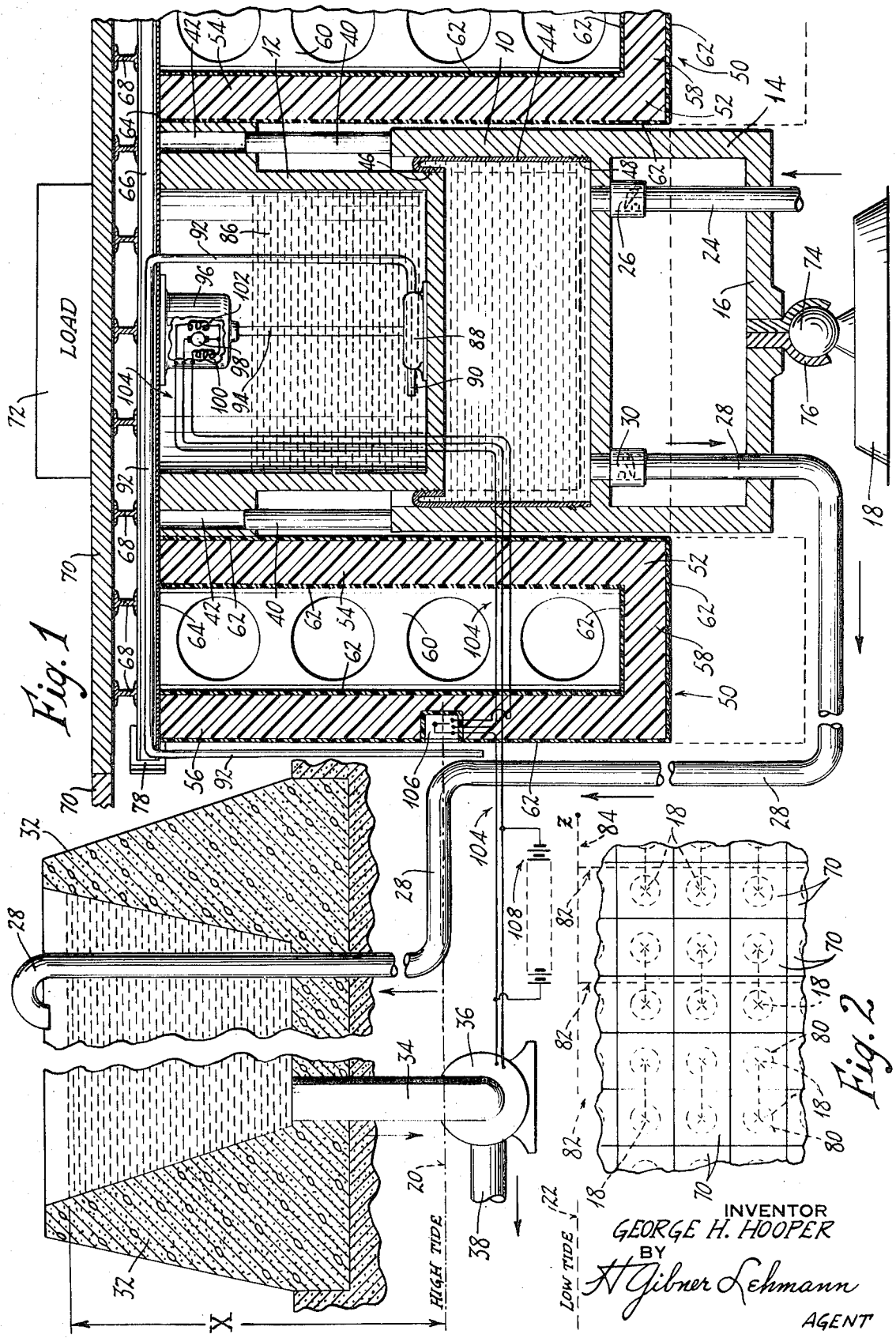

TIDE-POWERED UNIT AND FLOATING PLATFORM UTILIZING SAME

BACKGROUND

This invention relates to tide-powered electric generating means, and more particularly to such means wherein the lifting power of the rising water as the tide comes in is exerted on a bouyant or floating structure and, through mechanism connected therewith, converted into electrical energy.

Heretofore, tide-powered units have been proposed and constructed which utilize the rush or flow of water through an inlet or passage to power turbo-generators for producing electrical energy. Other tide-powered devices have been proposed, utilizing the lifting force of rising water as the tide comes in, to actuate mechanisms for producing power. Those devices which utilized the flow or inrush of water through a channel have operated satisfactorily but were restricted in the amount of power that was obtainable. Other devices, which were intended to use the lifting force of the water on buoyant objects, have not proved to be commercially feasible and practical, and in consequence did not come into widespread use.

SUMMARY

The above disadvantages and drawbacks of prior tide-powered generating devices are obviated by the present invention, which has for its main object the provision of a novel and improved tide-powered generating device utilizing the lifting force of water on buoyant objects, wherein large amounts of power can be stored and generated, and wherein no limitations are placed on the location of the units utilizing the tide, other than the requirement that a certain significant head of water exist between low and high tides, measured in a number of feet rather than in inches for example. A supplemental object of the invention is to provide an improved large capacity tide-powered electrical generating means as above, which can be utilized to support a large floating platform on which buildings, hangars, equipment and a landing field can be placed, to adapt the platform for use as an airport and air strip. The above objects are accomplished by a tide-powered unit comprising essentially a piston which is vertically movable in the open top of a cylinder set on end, the latter being anchored to the bottom of a body of water which experiences tides. Connected with the piston is a float, whereby the rise and fall of the tides will cause the piston to be raised and lowered with respect to the cylinder. The cylinder has a water inlet and a water outlet, both of which are valved whereby the rising movement of the piston will enable water to enter and fill the cylinder and the lowering movement of the piston will enable the latter to force the water out of the cylinder and into a conduit leading to a large reservoir which is located at a given elevation above the high water mark. The float and piston unit of such a device can be located alongside a multiplicity of other similar units, each cylinder being anchored to the bottom of the body of water, whereby a platform structure can be supported on and can interconnect the piston and float units. Thus, the overall power generating capacity will be that one unit multiplied many times while simultaneously there is had the capability of a large floating platform having exceptional stability whereby it is usable as a floating air strip, as well as for many other purposes.

Other objects and advantages of the invention reside in the provision of an improved tide-powered unit and floating platform utilizing a multiplicity of the same, wherein the structures involved are relatively simple, highly efficient in operation, of relatively low cost, sturdy, reliable and rugged, and so arranged as to facilitate servicing and maintenance.

Still other features and advantages will hereinafter appear.

In the drawings which illustrate several embodiments of the invention:

FIG. 1 is a vertical sectional view of a single tide-powered floatation-type power unit, and of a water reservoir located at a given elevation above the high tide mark of a body of water in which the unit is installed.

FIG. 2 is a fragmentary top plan view, greatly reduced, of a floating platform supported on a multiplicity of flotation units of the type illustrated in FIG. 1.

Figure 3:
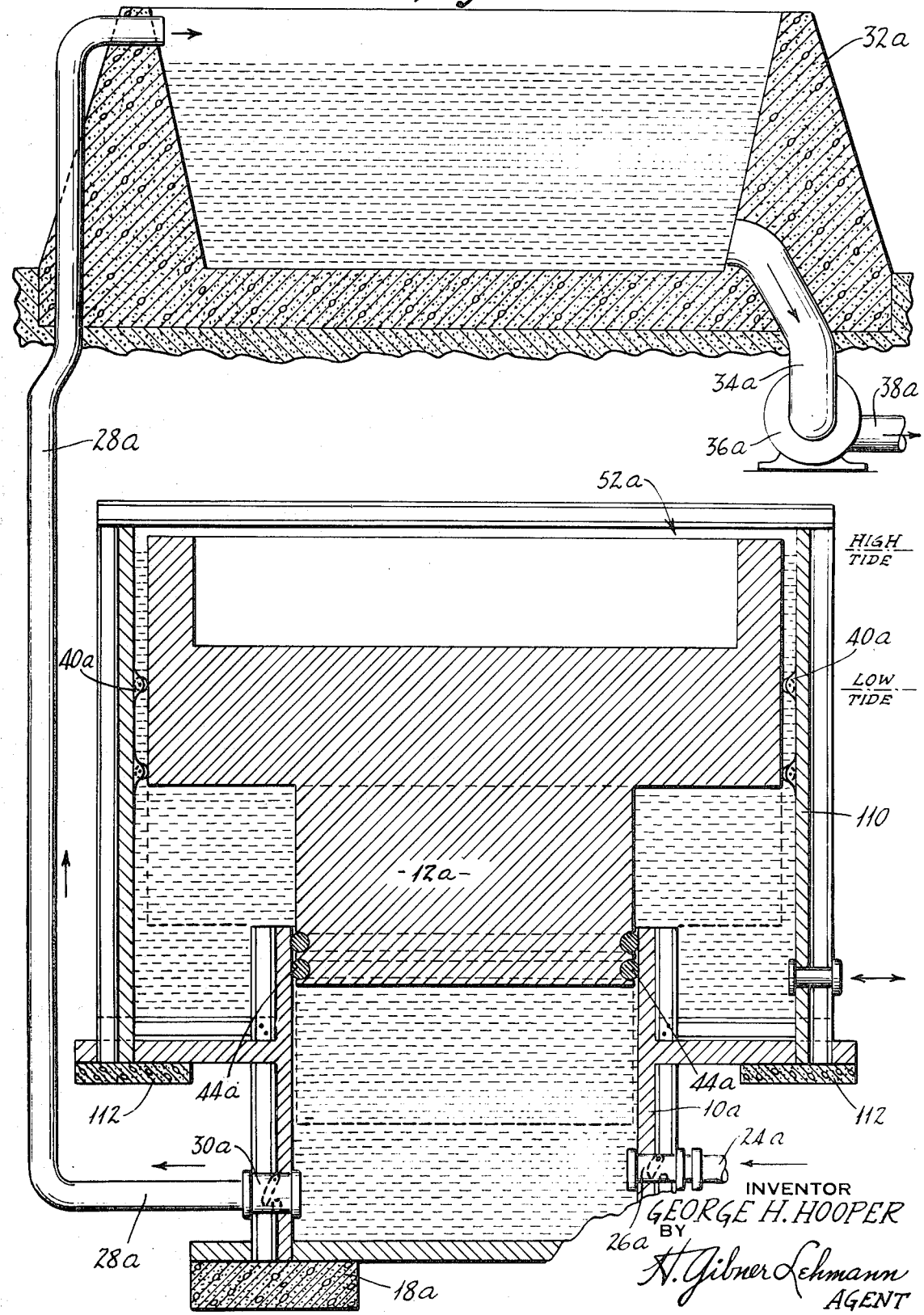
FIG. 3 is a vertical sectional view of a different type of flotation unit and reservoir, constituting another embodiment of the invention.

Considering first FIG. 1, in accordance with the invention there is provided a cylinder 10 disposed with its axis vertical, said cylinder having an open top in which there is vertically movable a piston 12 also disposed with its axis in the vertical. The cylinder 10 has a depending portion 14 provided with a bottom transverse wall 16 which is attached to an anchorage or base member 18 resting on the bottom of the body of water in which the unit is located. The high tide and low tide levels of the body of water are indicated respectively by the broken lines 20, 22. The cylinder 10 has a water inlet pipe 24 provided with a back check valve 26 which enables water to enter the cylinder through the pipe 24 but prevents egress of water therethrough. The cylinder 10 also has a water outlet pipe 28 provided with a back check valve 30 through which water can leave the cylinder 10. The outlet pipe 28 can have considerable length, and can be brought into a water reservoir 32 of large capacity as shown. A water discharge pipe 34 leads from the reservoir 32 to a turbo-electric generator 36 which has a water discharge 38. The generating of electric power from the reservoir 32 by means of the turbo-generator 36 is well understood, and needs no further explanation.

Guide rods 40 are provided at the upper end of the cylinder 10, said rods being received in vertical bores 42 in the piston 12 and constituting a guiding means for the latter to insure precise vertical movement thereof.

In accordance with the present invention a circular, flexible or resilient packing skirt 44 is provided, having its upper end portion folded back on itself and secured to the lower portion of the piston 12 in any suitable manner. The skirt 44 is located within the cylinder 10 in the manner of a liner therein, and has its lowermost portion 48 secured to the bottom peripheral portion of the cylinder 10 in any suitable manner. By such arrangement, the piston and cylinder constitute a closed chamber or vessel. As the piston 12 is raised in the cylinder 10, water can flow into the latter through the inlet pipe 24 and past the backcheck valve 26. As the piston 12 is forced downward in the cylinder 10, the water in the latter will be forced out of the cylinder through the outlet pipe 28 and the backcheck valve 30. During this latter procedure the backcheck valve 26 will be closed, as will be understood. Thus, downward movement of the piston 12 in the cylinder 10 will pump water into the reservoir 32, causing a filling of the latter, and such water can then be utilized to generate electric power.

As provided by the invention, a buoyant or float structure 50 and loading are connected to the piston 12 to cause the upward and downward movement of the same in the cylinder 10. The float 50 comprises an annulus 52 which surrounds the piston 12 and cylinder 10. The annulus 52 as seen in FIG. 1 can comprise an inner cylindrical wall 54, and concentric therewith and spaced outwardly therefrom an outer cylindrical wall 56. Or, the outer wall 56 can have a rectangular or cube-like exterior configuration. The inner and outer walls 54, are connected at their bottom edges by a circular bottom wall 58. Disposed between the inner and outer walls 56 are vertically extending reinforcing girder structures 60, preferably formed of aluminum or steel. The walls 54, 56 of the float 50 can be constituted of any suitable material, including plastic foam. In the case of a foam structure, sealing skin surface 62 are provided on the interiors and exteriors of the walls 54, 56 as well as on the bottom wall 58 to provide a watertight assemblage. The annulus or cube 52 constituting the float is secured to a top plate 64 to which the upper end of the piston 12 is also secured, whereby the float and piston constitute a rigid unit which rises and falls with the tide. Criss-cross girders 68, 68 are carried by the top plate 64, and the girders 68 are shown as supporting a floor surface 70 on which there is diagrammatically illustrated a load 72. The load 72 may comprise sheds, buildings, equipment and surfacing for an air strip and the like.

Considering the single tide-powered unit illustrated in FIG. 1, the operation can now be readily understood. The float annulus 52 has its lower portion submerged in the body of water to the extent indicated by the high tide line 20. A bottom surface of the piston 12 is at the same level as the high tide line 20, and the piston will be supported at such level by the float annulus 52. The cylinder 10 will be filled with water under the existing pressure in the body of water. As the tide recedes to the low tide level 22 shown in FIG. 1, the float 52 and the piston 12 will descend because of their weight and the weight of the load 72 carried thereby. This will effect a closing of the backcheck valve 26 in the inlet pipe 24, and will force the water from the cylinder 10 through the outlet pipe 28 and up into the reservoir 32. As the tide again comes in, the float 52 and piston 12 will again be raised, and the cylinder 10 will again fill with water, to be emptied in the manner explained above as the tide subsequently goes out. Accordingly, by such pumping action the reservoir 32 becomes filled gradually with water, additional water being pumped into it with each fall of the tide.

The cylinder 10 remains stationary, and in accordance with the invention is connected to the anchorage 18 by a pivotal joint comprising a ball 74 received in a socket structure 76 which is carried by and adjustable vertically in the bottom transverse wall 16 of the cylinder. With such arrangement, the pivotal attachment of the cylinder will permit slight lateral movements of the float, piston and cylinder without inducing strain in the anchorage, which might otherwise arise and to cause failure of the connection to the cylinder.

In accordance with the present invention and as illustrated in FIG. 2, a multiplicity of power units such as that shown in FIG. 1, can be assembled alongside each other and connected to multiple anchorages such as the anchorage 18 shown in FIG. 1. The power units all contribute to the support of the composite top platform comprising the units 70. The surfacing of the large platform as seen in FIG. 2 comprises a multiplicity of the squares 70. The criss-cross girders 66, 68 are provided with cooperable dive-tail fittings 78 such that any one individual piston and float unit can be lifted upward and removed from the remainder of the units for servicing, maintenance, etc.

The flotation units in FIG. 2 are shown diagrammatically as having cylindrical bores 80, representing the inner peripheries of the annuli 52. The outer portions of the annuli 52 of FIG. 1, comprising the outer wall 56, are described above as being optionally cylindrical. However, such outer portions may be of rectangular box or cube shape, that is, constituting cubic configurations whereby the floats will have much larger volumes and a much greater lifting capacity. In consequence, the flotation units of FIG. 2 with the cubic exterior configurations will have a greater power or work-performing capacity than similar units wherein the outer walls 56 are only cylindrical.

Referring again to FIG. 2, the outlet pipes of the multiple units are connected to outlet manifolds 82 which are in turn connected to a main outlet manifold 84 terminating at the point Z. At such point, the main outlet manifold 84 may be connected with the line 28 which fills the reservoir 32. Therefore, the large number of flotation units shown in FIG. 2 will be able to pump much more water into the reservoir 32 than the single flotation unit illustrated in FIG. 1.

For the purpose of compensating for unequal loading on the floor surface 70 by which some flotation units will experience more load than others and tend to float lower in the water, the piston 12 is provided with water ballast 86 which is controlled by a rotary reversible pump 88 having a short inlet-outlet pipe 90 and a long, inlet-outlet pipe 92, the latter extending horizontally along the platform 70 and having a downwardly extending portion at the exterior of the float annulus 52 so that it can discharge into the surrounding water or else suck up water from the surrounding body. The pump 88 is driven by a shaft 94 of a reversible electric motor 96 which is shown diagrammatically as having an armature 98 and two field windings 100, 102. A three-wire cable 104 leads from the motor 96 to a float-operated switch 106 and to a source of power such as a battery 108 or to the turbo-generator 36. The float-operated switch 106 effects an energization of the motor 96 for turning in one direction or the other, depending on whether the switch 106 is deeper in the surrounding water or occupies a shallower position therein. The float switch 106 is a single-pole double-throw switch as illustrated, and the net result of the illustrated construction is that when any one floatation unit is made to bear an excessively heavy load, causing it to rest lower in the water, the switch 106 will operate the motor 96 so as to pump out the ballast 86 from the piston 12, thereby to lighten the net load or compensate for the heavier load being carried by the particular platform surface 70. By energizing one or the other of the fields 100, 102 in conjunction with the armature 98 the motor 96 will be made to turn in either of opposite directions, as is well understood in the art. Another embodiment of the invention is illustrated in FIG. 3, which shows a flotation unit comprising a cylinder 10a supported by an anchorage 18a. Movable in the open top of the cylinder 10a is a piston 12a having packaging or O-rings 44a. The piston 12a is connected to a float 52a, the lower portion of the latter being shown as joined to the top end of the piston 12a. Rollers 40a carried at the interior of the cylindrical walls of a cylindrical guide 110 bear against the cylindrical outside of the float 52a and constitute a guiding means therefor and for the piston 12a. The cylinder 10a has an inlet pipe 24a with a backcheck valve 26a, and an outlet pipe 28a with a backcheck valve 30a. Footings 112 in addition to the footing 18a support the cylinder 10a and also the guide cylinder 110. The diameter of the piston 12a is appreciably smaller than the diameter of the float 52a, as shown. The discharge pipe 28a empties into the reservoir 32a, which has a discharge passage 34a providing water power for the hydraulic generator unit 36a having discharge pipe 38a.

Operation of the flotation unit shown in FIG. 3 is quite similar to that already explained above in connection with FIG. 1. The high and low tide levels are as indicated in the figure. It will be noted that the positions of the cylinder and float are those corresponding to the high tide condition, whereby the unit does not extend very high above the level of the surface of the body of water in which it is installed. In contrast to this, the flotation power unit of FIG. 1 extends an appreciable distance above the surface of the body of water in which it is installed. When the tide does out, the float 52a and piston 12a will descend as indicated by the broken outlines in FIG. 3. This will force water from the cylinder 10a up into the reservoir 32a. When the tide comes in, the float 52a will raise the piston 12a, and water will again enter the cylinder 10a from the surrounding body, in readiness for being pumped into the reservoir 32a upon the next ebbing of the tide.

Considering again FIG. 1, it has been calculated that with an outside float diameter of approximately 36 feet and an inside float diameter of approximately 18 feet, and with the piston 12 having a diameter of about 13¾ feet, the lifting force on the float unit comprising the piston and float (where the latter extends 10 feet below the water line) will be 624 lbs. per sq. ft. The lifting force on the float will be approximately 475,000 lbs. There is no lifting force on the bottom surface of the piston 12 since such surface is essentially at the same level as the surface of the surrounding body of water. The displacement of the piston for a 6 ft. tide will be approximately 890 cu. feet and the weight of water displaced by the piston will be approximately 55,600 lbs. The weight of the piston and float unit will be the same as the lifting force on the float, namely approximately 475,000 lbs. The work done by the piston in moving downward six feet will be approximately 2,854,500 ft. lbs. This work is available to lift 55,600 lbs. of water, and such water can be lifted through a height of slightly more than 51 feet. Subtracting the 6 foot tide, this means that the water can be lifted from the cylinder 10 to a height of 45 feet above the high tide level. The above weight of water represents approximately 6,900 gallons.

Considering FIG. 3, the diameter of the piston 12a is approximately 13¾ feet, and the area of the undersurface of the float 52a is approximately 445 sq. feet. The bottom surface of the float 52a, being approximately 10 feet below the water surface, will experience a lifting water pressure of 624 lbs. per sq foot, or a total lifting force of 278,000 lbs. approximately.

The lifting force at the bottom surface of the piston 12a will be approximately 171,000 lbs., since the piston area is 148 sq. ft. and has a pressure at a depth of 18.5 feet of 1,154 lbs. per sq. ft. The total lifting force on the piston and float is approximately 450,000lbs. which is therefore the combined weight of the piston and float. The displacement effected by the piston is approximately 890 cu. feet, and the weight of water displaced is approximately 55,600 lbs. The work done by the piston is therefore approximately 2,696,500 ft. lbs. To lift the displaced water of 55,600 lbs. there is available the work above defined, meaning that the water can be lifted to a height of approximately 48 feet. Subtracting from such height the distance of 18.5 ft. from the bottom of the piston 12a to the surface of the body of water leaves a 30 ft. lift which can be effected of the water from the cylinder 10 above the high tide mark of the body of water. The amount of water lifted 30 feet equals approximately 6,900 gals.

Considering again FIG. 1, the total lifting force on the piston and float unit was given as 475,000 lbs. where the float comprises an annulus with an outer cylindrical wall. If the outer configuration of the float is boxlike or rectangular, a much greater lifting force will be exerted by the float, and therefore the combined weight of the float and piston can be much greater. This will enable a greater driving force to be exerted on the water in the cylinder 10 when the tide goes out, enabling the water to be pumped to a much greater height than the figure of 45 ft. above high tide that was given in the above cited example. Thus, for an arrangement as illustrated in FIG. 2, wherein the floats have cube-like exterior configurations, and where a large number of float-piston units are employed, it will be seen that a considerable amount of power can be developed from the rise and fall of the tide. Each unit, if square, can force water up 64 ft. instead of 45 ft.

It will now be understood from the foregoing that I have provided a novel and improved tide-powered work-performing unit and a floating platform utilizing the same, wherein considerable power is realized from the rise and fall of a tide, as for example a tide of 6 ft. Not only is there generated an appreciable amount of electrical energy from the action of the tide, but with the arrangement illustrated in FIG. 2 there is had a large floating platform having its surface more than 15 ft. above the surface of the surrounding water, such platform being available for supporting buildings, sheds, equipment and also surfacing of a landing field or air strip. The pivotal mounting of the float-piston-cylinder units eliminates strains which would otherwise be experienced by rigid mountings and enables dimensions to be less critical.

Each additional unit that is added to the platform adds 6,900 gals. of water to the output that is pumped to the reservoir, for each tide change.

Variations and modifications are possible without departing from the spirit of the invention.

I claim:

1. A tide-powered work-performing unit comprising, in combination:
   a. a buoyant structure adapted to float in a body of water the level of which is influenced by tides,
   b. means in said body of water, providing a closed vessel having an inlet and an outlet, said vessel being adapted to experience an inflow of water through the inlet as the tide rises, said buoyant structure rising with said tide,
   c. a back-check valve in the inlet of the closed vessel means, preventing egress of water therethrough, and
   d. said closed vessel means having a movable wall portion drivingly connected with the buoyant structure and shifted inward by the latter as a consequence of the weight, in a direction to reduce the volume of the closed vessel means as the tide falls, thereby to force water out of the vessel means through the outlet thereof,
   e. said closed vessel means comprising a piston and a cylinder in which the piston is reciprocatable,
   f. said buoyant structure comprising a hollow, annular float larger in diameter than, and connected to, the piston to raise and lower the latter,
   g. said piston constituting the said movable wall,
   h. said float encircling the piston and cylinder,
   i. said piston, cylinder and float being set on a vertical axis,
   j. lower portions of said float being disposed below the bottom of the piston.

2. A unit as in claim 1, wherein:
   a. the float has a substantially cylindrical bore and a substantially cube-like exterior portion to enable it to have a maximum volume when a number of floats are disposed alongside each other in rows and columns.

3. A unit as in claim 1, wherein:
   a. the piston is hollow and contains water ballast,
   b. pump means for pumping ballast into and out of said piston, and
   c. an automatic switching device responsive to the level of the float in the water, for controlling said pump means.

4. A unit as in claim 1 and further including:
   a. guide means connected with the piston and cylinder, including a plurality of plungers and guideways in which the plungers are received and longitudinally movable.

5. A unit as in claim 1 and further including:
   a. an anchorage base disposed below the cylinder, and
   b. means pivotally connecting the cylinder to said anchorage base.

6. A unit as in claim 1 and further including:
   a. means providing a controlled water ballast for said float and piston.

7. A floating, power-producing platform comprising, in combination:
   a. a plurality of cylinders disposed side by side with their axes vertical,
   b. means connecting the bottom ends of said cylinders to anchorages,
   c. pistons vertically movable in the cylinders,
   d. floats connected to the pistons and encircling the latter and the cylinders,
   e. a platform structure joining together the upper portions of the floats,
   f. said cylinders having valved inlet and outlet passages,
   g. said outlet passages of the cylinders being interconnected with each other,
   h. lower portions of the floats being disposed at a level below the bottom ends of the pistons.

8. A unit as in claim 1 and further including:
   a. means for automatically controlling water ballast for the respective, connected floats and pistons, to compensate for unequal loading of different portions of the platform structure.

9. A unit as in claim 7, wherein:
   a. the platform structure includes separable joints to enable a piston and connected float to be removed as a unit upwardly from the remainder of the pistons and floats.

* * * * *